Patented Sept. 16, 1941

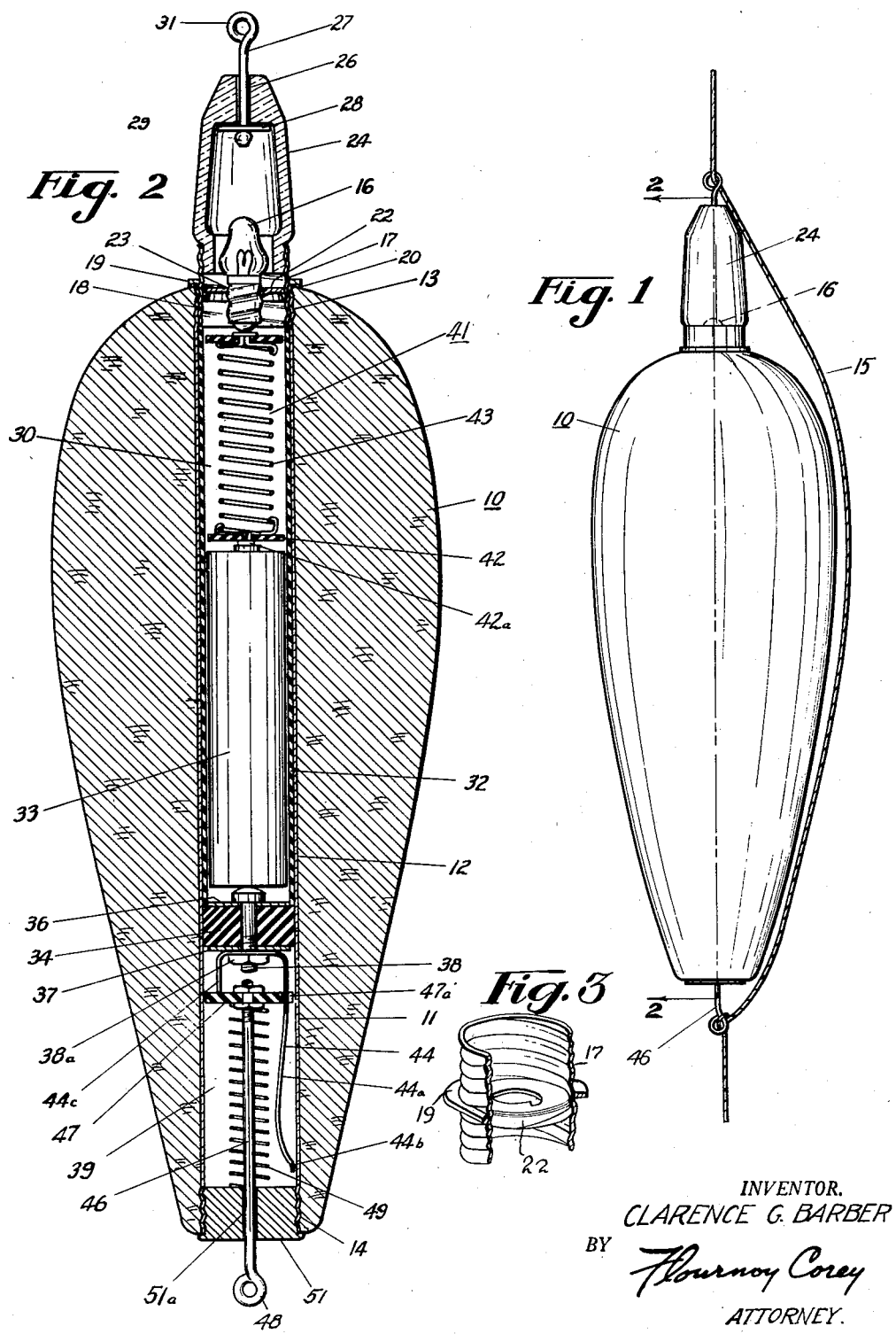

2,255,959

UNITED STATES PATENT OFFICE 2,255,959

INDICATING FLOAT

Clarence G. Barber, Cedar Rapids, Iowa

Application January 25, 1940, Serial No. 315,509

4 Claims. (Cl. 43—17)

This invention relates to bobbers or fishing line floats and has particular relation to a device of this nature especially adapted for use at night and one by which an indication may be given to the fisherman of the bite or strike of a fish on his line.

It is a particular object of my invention to provide a fishing line bobber or float for use either in the daytime or at night, and in which means are provided for lighting an electric bulb for giving a visual indication to the fisherman of a bite or strike on his line.

Another object of my invention is the provision of a relatively simple device of this nature in which means are provided for sealing the device against the entry of water and yet permitting the ready removal and replacement of the battery and bulb.

A further object of the invention is the provision, in a device of this character, of a simple, reliable circuit-closing structure which will not be damaged or made inoperable by ordinary rough usage or by jerks on the line and one in which repairs may be easily made when required.

A still further object of the invention is the provision of a switching device which is totally enclosed but still free acting and sealed against the entry of any substantial amount of water.

Other and further features and objects of the invention will be more apparent to those skilled in the art upon a consideration of the accompanying drawing and following specification, wherein is disclosed a single exemplary embodiment of the invention, with the understanding, however, that such changes may be made therein as fall within the scope of the appended claims, without departing from the spirit of the invention.

In said drawing:

Figure 1 is a side or elevational view illustrating the external appearance of an indicating fish line float constructed according to a preferred embodiment of my invention, and Figure 2 is an enlarged view in section taken along the line 2—2 of the device shown in Figure 1, and illustrating the structure thereof.

Figure 3 is an enlarged fragmentary view in perspective of the bulb screw shell or upper end of the barrel.

Referring now to the drawing:

In general, a device constructed in accordance with my invention comprises a buoyant body member or float 10, an electrically energizable bulb 16 at the top thereof and a transparent cover member for enclosing the bulb and sealing the top of the device against the entry of water. A circuit closing device, preferably positioned in the lower end of the body, is actuated by means of a rod member extending through the lower end of the float, as shown at 46.

The fishing line 15 is tied or looped around this operating rod at the lower end thereof and then passed upwardly around the float or body member 10 and through a ring or a looped tie member 31 extending through the upper end of the transparent cover.

The main body of the float 10 may be formed of any buoyant material such as cork, wood or the like, and is preferably formed, as illustrated in the drawing, with the lower portion more or less conical in shape and with the upper portion enlarged and preferably hemispherical in shape.

This buoyant member 10 is drilled from end to end to provide a longitudinally extending cylindrically-shaped opening 11. A tubular sleeve or casing 12 is snugly received in this opening and is provided with internal threads on both ends thereof, as shown at 13 and 14.

A miniature lamp bulb 16 is adapted to be received in a screw receptacle, indicated generally at 17 (Figures 2 and 3). This screw receptacle may be in the form of a sleeve-like member threaded on both ends to permit one end to be screwed into place in the upper end of the barrel 12 and as shown at 18. The opposite end is adapted to threadedly receive a cap-like member 24 of glass, plastic, or other similar transparent material. The bulb receptacle 17 is also provided with an outwardly extending flanged portion 19 under which a gasket 20 may be placed to seal the upper end of the sleeve 12. Another flange 22 extending inwardly from the bulb receptacle member is provided with a threaded opening 23 in the center thereof for receiving the bulb. The flange 19 may comprise a flat ring-like member held in position by soldering or the like. The bulb receptacle flange 22 is preferably made with a close fit within the sleeve member 17 in which it may be permanently fixed by soldering or any other suitable means.

The transparent cover member 24, into the lower end of which the bulb 16 projects, preferably tapers inwardly toward the top. An opening 26 extends vertically through the upper end of this glass cover to receive a tie member 27. This tie member may be passed through a washer 28 on the inner side of the cover 24 and attached to the washer by flattening, as shown at 29, or by any other desired means to prevent it from passing through the washer. The end of the wire may then be passed upwardly through the opening 26 and formed into a loop 31 at its upper end. It is desirable, of course, that the looped tie member 27 be sealed in the opening by wax or the like to prevent the entry of water.

The upper portion of the barrel 12 is preferably provided with an insulating sleeve 32 to form a liner in the battery chamber 30 in which a dry cell battery 33 may be received.

The battery chamber may be completely sealed against the entry of water at the lower end by means of an expanding plug 34. This plug may be of soft rubber or any similar material squeezed together between washer members 36 and 37 by means of a cap screw 38. This expanding plug serves not only to form the lower end of the battery chamber 30, but also the upper end of a lower chamber 39 in which the circuit closing or switching mechanism is located. The cap screw 38 also serves to make contact with the case of the dry cell.

In order to place the weight of the dry cell as low as possible in the float member, so that it will serve to some extent as ballast and hold the float upright, the expandable plug 34 is placed as low in the sleeve 12 as the switching mechanism will permit.

A spring conductor member, indicated generally at 41, is provided in the upper end of the barrel to bias the dry cell downwardly against the contact member 38 and also to act as a conductor between the upper terminal of the battery and the center terminal of the bulb. This spring member 41 may include insulating washer members 42 at each end thereof and rivet-like contacts 42a mounted through an opening in each insulating washer, and crimped around the adjacent end of the spring 43.

It will be seen that a circuit through the battery, through the spring 41, the bulb 16, the bulb receptacle 17, and the barrel or sleeve 12 of the float member may be completed by a connection between the cap screw 38 and the barrel of the float. In order to accomplish this, I have provided the resilient contact finger 44. This member is provided with an opening near its upper end to permit it to be received under the nut 38a of the cap screw 38 and is bent so as to extend downwardly for a short distance parallel with the side of the sleeve 12 and then inwardly away from the side of the sleeve to form an inclined surface 44a. The lowermost end of the contact finger is then bent outwardly so as to normally be out of contact with the barrel 12.

The rod 46 for operating the switch mechanism extends upwardly through the bottom of the float member and is threaded at its upper end to receive a pair of nuts and a fiber washer 47 therebetween. This washer is of such a size as to permit free sliding movement within the sleeve and the washer is provided with a recess 47a on one side thereof for the reception of the contact finger 44.

The switch rod 46 is provided at its lower end with a loop 48 to which the fish line may be attached, and in operation, when the line is jerked or disturbed, as by the bite or strike of a fish, the washer 47 will be moved downwardly against the action of the spring 49. The insulating washer 47 serves to wedge the contact finger 44 outwardly and cause the contact portion 44b thereof to make contact with the barrel of the float and thus cause the bulb to be illuminated.

The plug member 51 is provided to close the bottom of the switch chamber and is provided with threads to permit it to be screwed into the lower end of the barrel. It also serves as a guide for the switch rod 46, and may be made of lead or other heavy material to furnish, with the battery, ballast for holding the float in upright position.

It will be obvious that air will be trapped in the switch chamber 39 and will prevent the entry of any amount of water through the rod opening 51a sufficient to interfere with the operation of the switch. It is preferable, however, that all metal parts be of rust resisting materials such as brass.

In order to prevent the switch rod 46 from contacting the lower end of the cap screw 38, the end 44c of the contacting finger is bent over so as to extend parallel to the side of the barrel and act as a stop against which the fiber plunger or washer 47 may come to rest.

I have devised a fishing line bobber or float of such construction as to present a neat, streamlined external appearance, and one in which all operating mechanism is totally enclosed and yet which may be readily disassembled and the parts removed for replacement or repair. Simple, rugged means are provided for sealing the device against the entry of water and for closing an electrical circuit to energize the indicating bulb. Furthermore, the construction of the circuit closing device, which I have described in detail, is such that it is not easily damaged by rough usage or by jerking on the fish line.

It is to be noted also that the entire indicating and switching structure is adapted to be received in a single bore in the bobber and that no flanges, additional recesses or the like, are necessary in the bobber.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a fishing float, a buoyant body portion, a tubular sleeve extending therethrough, a plug-like separator positioned in the sleeve to form an upper battery compartment and a lower switch compartment, an electrical conductor passing through the separator, a plug having an axial opening therethrough received in the lower end of the sleeve, a contact finger in the switch compartment connected with the conductor, and means for causing the contact finger to make contact with the sleeve, said means including a plunger and a plunger rod extending through the opening in the plug.

2. In a fishing float, a buoyant body member, a tubular sleeve extending longitudinally therethrough, plug means for forming a water tight separator positioned between the ends thereof, an electrical conductor extending through the plug and adapted to make contact with a dry cell placed above the said conductor, a resilient contact finger connected with said conductor and having a free end thereof normally spaced from the wall of the sleeve, a plunger for wedging the contact finger against the sleeve, a means for closing the lower end of the sleeve, and rod means connected with the plunger and extending through an opening in the last mentioned closure, and means for permitting free operation of the plunger from without the float.

3. In a fishing float, a buoyant body member having a cylindrical opening extending therethrough, expandable plug means for separating the opening into an upper battery compartment and a lower switch compartment, means for receiving a bulb in the upper end of the battery compartment, removable means for sealing the upper end of the battery compartment against the entry of water, switch means in the switch compartment, means extending through the bottom of the compartment for operating the switch, and plug means removably mounted in the lower end of the switch compartment and having an opening extending vertically therethrough for receiving the operating means, the switch compartment being sealed against the entry of any substantial amount of water by the air imprisoned in the switch compartment below the expandable plug.

4. In a fishing float, a buoyant body member, a tubular electrical conductive sleeve extending longitudinally through the center of the body member, means comprising a compressible plug, a pair of washers and a bolt-like member for expanding the compressible plug to form a water-tight separator in the sleeve, a plunger of insulating material disposed in the sleeve below the separator, externally operable means for causing movement of the plunger longitudinal of the sleeve, and a substantially L-shaped resilient contact finger, the said contact finger having one leg thereof attached to the bolt-like member and having the other leg thereof bent inwardly away from the wall of the sleeve, the extreme end of the last mentioned leg being normally spaced from and out of contact with the wall of the sleeve, whereby longitudinal movement of the plunger in one direction will cause the said plunger to contact the bent portion of the contact finger and thereby cause the extreme end of the finger to contact the wall of the sleeve.

CLARENCE G. BARBER.